United States Patent [19]
Yeilding

[11] Patent Number: 5,850,175
[45] Date of Patent: *Dec. 15, 1998

[54] WATER LEVEL DETECTOR

[76] Inventor: Hollis Yeilding, P.O. Box 1324, Weaverville, Calif. 96093

[ * ] Notice: This patent issued on a continued prosecution application filed under 37 CFR 1.53(d), and is subject to the twenty year patent term provisions of 35 U.S.C. 154(a)(2).

[21] Appl. No.: 804,031

[22] Filed: Feb. 19, 1997

[51] Int. Cl.⁶ .................................................. G08B 21/00
[52] U.S. Cl. .................. 340/431; 340/618; 340/623; 340/625; 73/305; 73/313; 73/317; 200/84 R
[58] Field of Search .................. 340/431, 438, 340/618, 623, 624, 625, 984, 686, 620; 73/305, 306, 317, 308, 309, 313; 200/84 C, 84 R, 61.48, 61.45 M

[56] References Cited

U.S. PATENT DOCUMENTS

| | | | |
|---|---|---|---|
| 3,585,582 | 6/1971 | Dove | 340/431 |
| 3,874,223 | 4/1975 | Miyazaki et al. | 73/32 R |
| 3,995,251 | 11/1976 | Jones | 340/431 |
| 4,175,435 | 11/1979 | Hara | 73/313 |
| 4,398,186 | 8/1983 | Statz | 340/616 |
| 4,680,575 | 7/1987 | Yazaki | 340/624 |
| 4,940,251 | 7/1990 | Willmsen | 280/414.1 |
| 5,097,250 | 3/1992 | Hernandez | 340/438 |
| 5,396,857 | 3/1995 | Emery | 340/438 |
| 5,515,025 | 5/1996 | Barrows | 340/431 |

*Primary Examiner*—Jeffery A. Hofsass
*Assistant Examiner*—Davetta Woods
*Attorney, Agent, or Firm*—Theodore J. Bielen, Jr.

[57] ABSTRACT

A liquid level detector utilizing a housing having a wall portion defining a inner chamber. The inner chamber communicates to the exterior of the housing through an opening which also permits liquid to enter the chamber. A floatation element is pivotally located within the housing and includes a bridging conductor which rotates upwardly. The bridging conductor is capable of contacting a pair of terminals which constitute a portion of an alarm circuit.

5 Claims, 1 Drawing Sheet

WATER LEVEL DETECTOR

BACKGROUND OF THE INVENTION

The present invention relates to a novel and useful liquid level detector.

The level of a liquid relative to an edifice, a vehicle, or other structure is often important to determine. For example, the level relative to liquid of a boat trailer is important to determine whether or not the trailer extends sufficiently into a body of water to allow the boat thereupon to float.

In this regard, U.S. Pat. Nos. 3,585,582, 5,097,250, and 5,515,025 describe signaling devices for boat trailers which are launching a boat on a ramp. The water level sensors in these devices include floating members within a cylinder that move upwardly under the buoyant force of water entering the cylinder. Unfortunately, tolerances within a cylindrical type chamber often cause such floating members to jam or freeze, preventing use of the same.

U.S. Pat. No. 3,995,251 shows a alerting device for water level relative to a trailer which includes a pivoting arm which is rotated by a floating ball on one end and activates an electrical contact on the other end through a membrane extending into a housing chamber. The majority of the system found in the Jones patent is exposed to the exterior elements and is susceptible to damage.

A liquid level detector which is compact and reliable would be a notable advance in the electrical arts.

SUMMARY OF THE INVENTION

In accordance with the present invention a novel and useful liquid level detector is herein provided.

The detector of the present invention utilizes a housing having a wall portion which defines an inner chamber. At least one opening extends into the chamber to permit liquid to flow therewithin. The housing may be a rigid member and is easily mounted to the vehicle having a boat launching trailer.

A floatation element is also found in the present invention and is located within the housing inner chamber. A floatation element may be of any suitable material such as wood, cork, foam, plastic, a sealed hollow member, and the like. The floatation element lies completely within the chamber and is protected from the outside elements thereby. Pivot means is also found in the present invention for rotating the floatation member when a liquid enters the inner chamber of the housing and exerts a buoyant force on the floatation element. The pivot means may take the form of one or more elongated elements which extend from the floatation element to the wall of the housing. Means for rotatably connecting the elongated elements to the housing serves as a portion of the floatation member pivot means, to permit the floatation element to rotate outwardly from the rising water level within the housing chamber.

Alarm means works in combination with the housing and floatation element to produce a signal when the level of water rises relative to a certain height of the housing. The alarm means includes an electrical circuit and electrical power means for activating the alarm means. The electrical circuit also possesses a pair of conductor terminals which are spaced from one another and are fastened to extend into the inner chamber of the housing. The pair of conductor terminals may take the form of probes which are relatively rigid and extend through the housing. Electrical wires from the electrical circuit connect to the probes at the exterior of the housing.

To complete the circuit by interconnection of the terminals extending into the housing inner chamber, a bridging conductor is provided. The conductor is connected to the floatation element and moves outwardly from the rising liquid level through the action of the pivot means. When rotated a certain degree about the pivot, the bridging conductor completes the electrical circuit between the pair of conductor terminals, thus, setting off the alarm or alerting means. It should be noted that the alerting means may take the form of a visual, audio, electrical, or other signal which is detectable by an operator utilizing the liquid level detector.

The housing of the liquid level detector may be mounted to a vehicle or any suitable edifice for use. The housing provides a great degree of protection for the moving elements of the detector of the present invention.

It may be apparent that a novel and useful liquid level detector has been described.

It is therefor an object of the present invention to provide a liquid level detector which is easily and conveniently mounted on a structure such as a vehicle capable of launching a boat from a trailer to determine the proper depth of the trailer along a boat ramp.

Another object of the present invention is to provide a liquid level detector which is reliable and includes a minimum of moving parts.

A further object of the present invention is to provide a liquid level detector which is usable in salt or fresh water media.

Yet another object of the present invention is to provide a liquid level detector which is not susceptible to breakage as liquid level detectors in the prior art.

Another object of the present invention is to provide a liquid level detector which detects flooding conditions.

The invention possesses other objects and advantages specially as concerns particular characteristics and feature thereof which will become apparent as the specification continues.

For better understanding of the invention reference is made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments which should be referenced to the hereinbefore described drawings.

Figure 1:
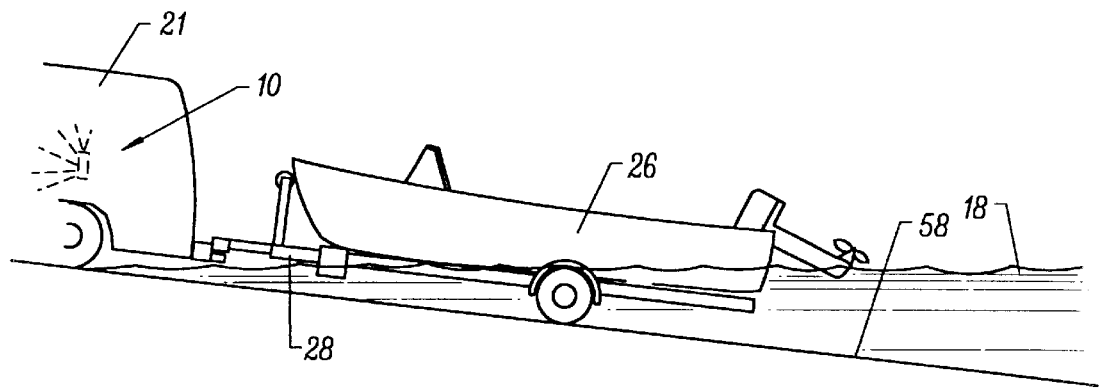
FIG. 1 is a side elevational view showing the detector of the present invention in use with a vehicle and a boat trailer.

The invention as a whole is shown on the drawings by reference character 10. Liquid level detector 10 includes as one of its elements a housing 12 which may be formed into the shape of a cube, rectangular solid, or any other suitable enclosure. Housing 12 includes a wall portion 14 having a plurality of openings 16 therethrough to allow liquid from liquid body 18 to pass. Housing 12 includes an inner chamber 20 which may be filled with liquid as housing 12 is moved into body of liquid 18. Housing 12 attaches to any suitable body such as vehicle 21. Ears 22 and 24 aid in this endeavor and may be employed with any fastener such as screws, nails, pegs and the like. As depicted in FIG. 1, housing 12 is fixed to vehicle 21 above the rear left wheel of the same. The position of the housing 12 is commensurate with the level of liquid surrounding boat 26 on trailer 28 in the embodiment depicted in FIG. 1. However, it should be noted that detector 10 may be used in other circumstances i.e. to detect flooding of a basement, level of liquid in a stream, and the like.

Floatation element 30 is also found in the present invention. Floatation element 30 may be formed of any floating material relative to liquid 18. For example, wood, plastic foam, rubber, and the like may be employed in this regard. Floatation element 30 is connected to the wall 14 of housing 12 by pivot means 32. In the embodiment shown, FIG. 2, pivot means 32 includes an elongated element 34 passing through floatation element 30 and rotatably connected to wall 14 of housing 12. In certain instances, elongated element 34 may be a pair of members each connected to floatation element 30 and to wall 14 of housing 12. Pivot means 32 allows floatation element 30 to rotate away from liquid body 18 when the liquid body exerts a buoyant force thereupon. Such movement is illustrated by directional arrow 36 on FIG. 2.

Figure 2:
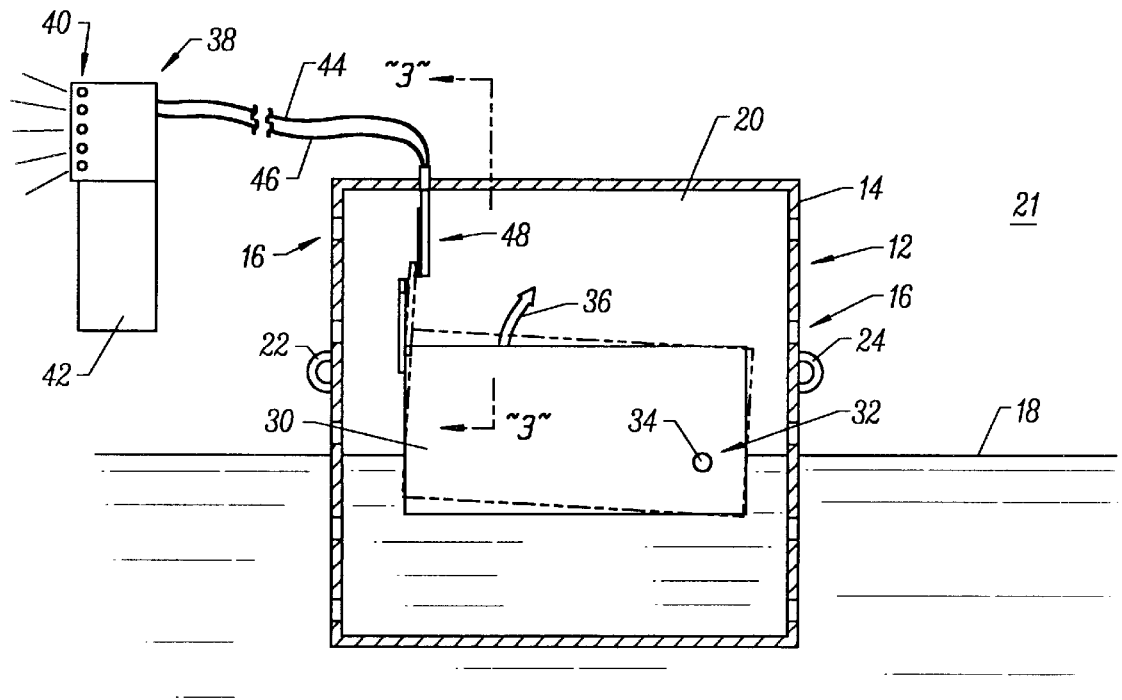
FIG. 2 is a sectional view of the housing portion of the detector of the present invention showing the alerting means remotely connected thereto.

Alarm means 38 is also depicted in FIG. 2. Alarm means 38 includes an alerting mechanism 40, a horn in the present embodiment, a source of electrical power such as a battery 42, and a pair of conductors 44 and 46 which extend from horn 40. Conductors 44 and 46, when connected to one another, complete the circuit to permit battery 42 to sound horn 40 in the conventional manner. Conductors 44 and 46 terminate in a pair of conductor terminals 48 and 50, FIG. 3 which extend into chamber 20 of housing 14. Terminals 48 may take the form of a pair of rigid probes 52 and 54, which extend through wall 14 of housing 12 and are rigidly fixed thereat. Of course, conductors 44 and 46 are electrically and mechanically connected to probes 52 and 54 in this regard.

Bridging conductor 56, which is generally tee-shaped, is rigidly affixed to floatation element 30. Thus, bridging conductor 56 rotates away from body of liquid 18 according to directional arrow 36, FIG. 2. Bridging conductor 56 is also capable of contacting terminals 48 and 50 simultaneously when such rotation occurs. Thus, the circuit capable of sounding horn 40 is closed when bridging conductor 56 contacts probes 52 and 54.

Figure 3:
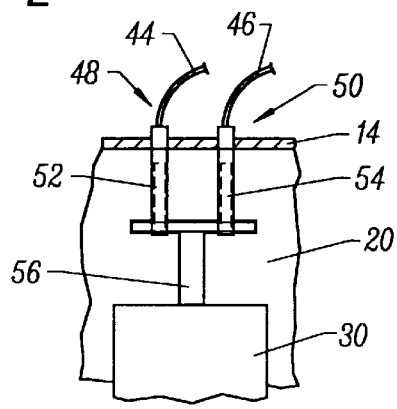
FIG. 3 is a sectional view taken along line 3—3 of FIG. 2.

In operation, detector 10 is mounted to vehicle 21, in the particular embodiment shown in FIGS. 1–3. Detector 10 is mounted at a level above the ground surface commensurate with the water level of body of water 18 being able to float boat 26 from trailer 28. Vehicle 21 is backed down ramp 58 until liquid from liquid body 18 passes through opening 16 and into inner chamber 20 of housing 12. At a particular time, floatation element 30 pivots according to pivot means 32 and along an arc approximating directional arrow 36. At this point, bridging conductor 56 contacts probes 52 and 54 of terminals 48 and 50. Such contact completes the circuit of alarm means 38 and sounds horn 30. At this point, the operator of vehicle 21 stops vehicles from backing further down ramp 58 and floats boat 26 from trailer 28. It should be noted that detector 10 may be adjusted easily along vehicle 21 to coincide with such floatation mode for boat 26. Of course, such position will vary according to the steepness or shallowness of ramp 58. In this regard, detector 10 may be fastened to vehicle 21 by magnets, removable adhesives, or other fastening means which are relatively temporary in nature.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A liquid level detector comprising:

a. a housing, said housing having a wall portion defining an inner chamber to permit entry of liquid into said chamber;

b. a floatation element located within said housing inner chamber;

c. alarm means, including an electrical circuit and electrical power means for activating said alarm means; said electrical circuit including a pair of conductor terminals spaced from each other and exposed within said inner chamber, said pair of conductor terminals being fixed to said housing wall portion in a particular orientation;

d. a bridging conductor connected to said floatation element electrically connecting and physically contacting said pair of conductor terminals to complete said electrical circuit by conduction between said bridging conductor and said pair of conductor terminals; and e. pivot means for rotating said floatation element and said bridging conductor into stopped physical contact with said pair of conductor terminals, said floatation element being rotated by the buoyant force of the liquid in said chamber.

2. The detector of claim 1 in which said bridging conductor includes said floatation element being formed of electrically insulative material and said bridging conductor being connected to said floatation element of electrically insulative material.

3. The detector of claim 1 which additionally comprises support means for mounting said housing to a vehicle.

4. The detector of claim 3 which additionally comprises said pair of conductor terminals including a pair of relatively rigid probes, each probe being connected to a wire and support means for holding said probes to said housing.

5. The detector of claim 4 in which said pivot means includes an elongated element connected to said floatation element and means for rotatably connecting said elongated element to said housing.

\* \* \* \* \*